United States Patent [19]
Kuhlman

[11] 4,248,173
[45] Feb. 3, 1981

[54] SHREDDED MEAT APPLICATOR

[76] Inventor: Harvey G. Kuhlman, N56 W21466 Silver, Menomonee Falls, Wis. 53051

[21] Appl. No.: 938,705

[22] Filed: Aug. 31, 1978

[51] Int. Cl.³ .............................................. B05C 5/00
[52] U.S. Cl. ........................................ 118/20; 118/24
[58] Field of Search .................. 118/20, 24, 25, 69; 426/524, 292, 94, 391

[56] References Cited
U.S. PATENT DOCUMENTS

| | | | |
|---|---|---|---|
| 1,236,837 | 8/1917 | Granlund | 118/25 X |
| 3,368,501 | 2/1968 | Kuhlman | 118/24 X |
| 3,779,205 | 12/1973 | Kuhlman | 118/24 |

Primary Examiner—John P. McIntosh
Attorney, Agent, or Firm—Andrus, Sceales, Starke & Sawall

[57] ABSTRACT

A granulated meat applicator deposits granulated meat onto a series of pizza shells. A shell or crust conveyor is located beneath a meat conveyor to transfer sauce covered shells beneath the meat conveyor. Frozen shredded meat is deposited onto the infeed end of the meat conveyor and discharged therefrom onto the shells carried by the shell conveyor. A meat recovery conveyor means receives shredded meat which falls through the shell conveyor and returns it to the meat conveyor. The total assembly is enclosed within an outer enclosure having side walls and a top wall with appropriate conveyor openings. A pair of cooling means are alternately operated and defrosted to create a continuous flow of cool air upwardly to the top of the enclosure and then downwardly over the conveyors and the meat and the shells. Auxiliary cooling plates may be located adjacent to the meat conveyors to further insure that the granulated meat remains frozen.

6 Claims, 4 Drawing Figures

SHREDDED MEAT APPLICATOR

BACKGROUND OF THE INVENTION

This invention relates to a food-depositing apparatus and particularly to an automatic means and apparatus for applying and depositing a shredded or granulated meat upon a based member such as a pizza crust.

Manual processing and production of pizzas, particularly frozen pizzas which are sold in grocery stores and the like, is a relatively time consuming and expensive procedure and makes quality control difficult. As a result of such problems and the like, various automatic pizza forming devices have been suggested in the pizza forming art. Highly satisfactory apparatus is disclosed in the several patents of the present inventor, such as U.S. Pat. No. 3,368,501, which issued Feb. 13, 1968; U.S. Pat. No. 3,682,106 which issued Aug. 8, 1972 and U.S. Pat. No. 3,779,205 which issued Dec. 18, 1973. Such patents disclose highly satisfactory automatic apparatus for the processing of pizzas by the automatic and sequential application of the various materials to a pizza base including sauce, meat, shredded cheese and the like. U.S. Pat. No. 3,368,501 particularly discloses a highly satisfactory means for applying of shredded food which has been particularly satisfactory in depositing of cheese on sauce covered shells. U.S. Pat. No. 3,779,205 discloses an apparatus particularly adapted for applying of shredded meat to the base members.

Although such systems provide significant teaching in the development and product of pizza forming apparatus, they have not generally had the capability of automatic application of shredded meat with the control and/or speed comparable to that of the application of the shredded cheese and sauce particularly with the high degree of accuracy desired in the metering of the meat.

SUMMARY OF THE PRESENT INVENTION

The present invention is particularly directed to a granulated meat applicator for automatic depositing of accurately metered quantities of the granulated meat on a pizza shell or other base member. Generally, in accordance with the present invention, the granulated or shredded meat is supplied to a meat conveyor means of a meat applicator apparatus in a frozen or essentially frozen state, and the meat applicator apparatus is enclosed within a controlled cool environment to prevent thawing of the shredded meat. The meat conveyor means includes a means to transport the granulated meat to a discharge end from which the meat falls onto the bases, which pass thereunder. A metering means is mounted adjacent the discharge end to provide a controlled free-fall column of the granulated meat for producing accurate amounts of the meat upon each shell. The conveyor means and associated equipment such as the metering means are enclosed in any suitably walled means with a cooling means provided therein for establishing a maximum temperature during the transport and depositing of the granulated meat to insure the proper control and application to the bases. In addition to the cooling enclosure, auxiliary cooling means may be located adjacent to the belt to further insure that the granulated meat remains frozen. Further, the inventor has found that a significantly better quality control results if the meat is applied to the sauce coated crusts prior to application of the cheese.

In a particular preferred construction, a metering means includes a rotating tined beater having a plurality of radial rods or tines of differing lengths. The rotating tined beater is located immediately adjacent the upper discharge end of the meat conveyor means.

In a practical construction a shell or crust conveyor and the meat conveyor are suitably supported in superimposed relationship. The frozen shredded meat is deposited from a suitable source to a hopper overlying the infeed end of the meat conveyor for discharge onto the meat conveyor. The shell conveyor includes an apertured support surface such as that provided by spaced belts. A meat recovery conveyor is located immediately beneath the shell conveyor such that any of the shredded meat which falls through the conveyor drops onto the recovery conveyor. A return conveyor is specially constructed such as a cleated belt to accept the shredded meat from the recovery conveyor, carry it upwardly and deposit it onto the meat conveyor. The total assembly is enclosed within an outer enclosure having sidewalls and a top wall with appropriate conveyor openings for passing of the shells through the enclosure and the meat application apparatus. A pair of alternating cooling devices are alternately operated to create a continuous flow of cool air upwardly to the top of the enclosure and then downwardly over the stacked conveyors and the associated apparatus.

The present invention has been found to provide a highly reliable means for depositing of highly accurately metered amounts of granulated or shredded meat.

BRIEF DESCRIPTION OF THE DRAWINGS

The drawings furnished herewith illustrate the best mode presently contemplated by the inventor for carrying out the invention in which the above advantages and features are clearly disclosed as well as others which will be readily and fully understood from the following description.

In the drawings.

DESCRIPTION OF THE ILLUSTRATED EMBODIMENT

Figure 1:
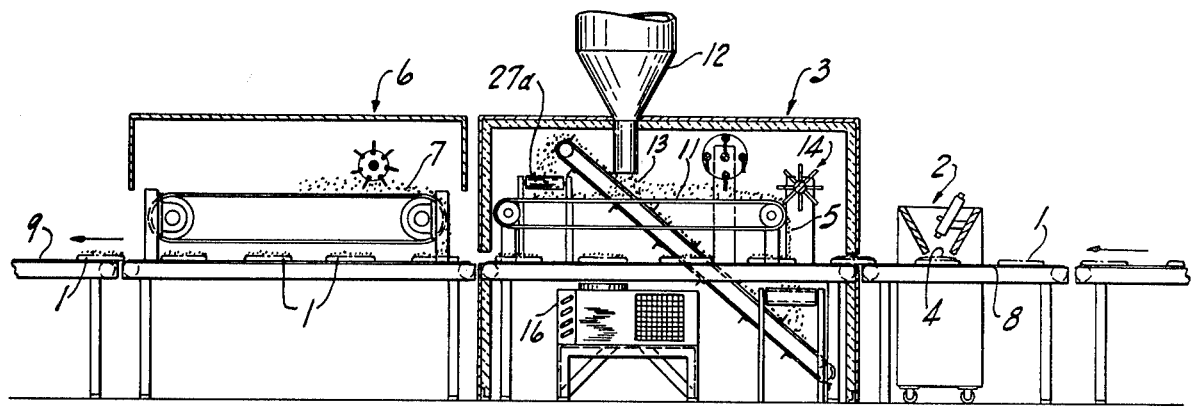
FIG. 1 is a side elevational view of the pizza processing apparatus incorporating the subject matter of the present invention.

Referring to the drawings and particularly to FIG. 1, the present invention as illustrated in connection or applied to pizza processing apparatus in which preformed shells 1 are fed from a suitable source into the apparatus. Generally, the apparatus includes a sauce applicator 2 which is mounted adjacent to the infeed end of a shredded meat applicator apparatus 3 which particularly forms an embodiment of the present invention. The shells 1 are thus first coated with a sauce 4 and then the sauce-covered shell receives a quantity of shredded meat 5. The shells 1 are fed therefrom into an automatic cheese applicator 6 for application of a covering of shredded cheese 7. The shells may be fed to the applicator 2 from an automatic shell forming apparatus, a manual preformed loading station or the like. An infeed shell belt 8 is shown mounted to the input side of the sauce applicator 2 and is adapted to transfer in proper sequence a plurality of pizza shells 1 in sequentially spaced aligned rows. If desired, of course, single pizza shells can also be sequentially fed through the system. After suitable processing, the pizza shells 1 are discharged to a transfer belt 9 from the discharge end of the cheese applicator 6 where they are transferred to a final processing unit, not disclosed, such as a final baking and freezing apparatus.

The various conveying elements, the sauce applicator 2 and the cheese applicator 6 may be formed of any suitable apparatus such as that disclosed in the present inventor's issued patents. The present invention is particularly directed to the shredded meat applicator 3 and, consequently, no further description of the other components and devices are given other than as are necessary to clearly describe the preferred construction of the present invention.

The inventor has found that the shredded meat should be applied in essentially frozen form and directly to the sauce covered shell 1, rather than deposited after the application of the shredded cheese. This has been found to be desirable to ensure proper retention of the shredded meat 5 without interfering with proper application and retention of the shredded cheese.

Figure 2:
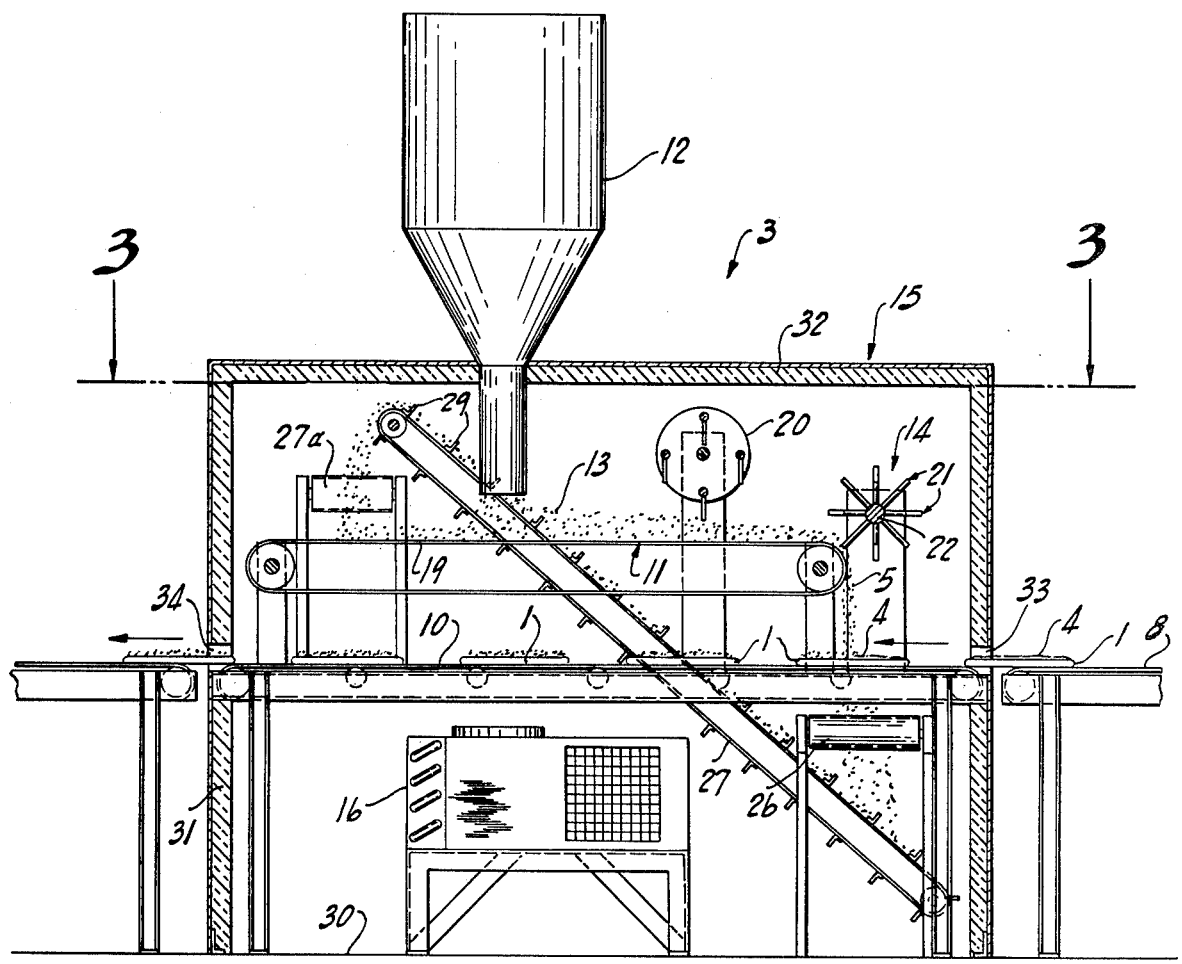
FIG. 2 is an enlarged side elevational view of the apparatus of FIG. 1.
Figure 3:
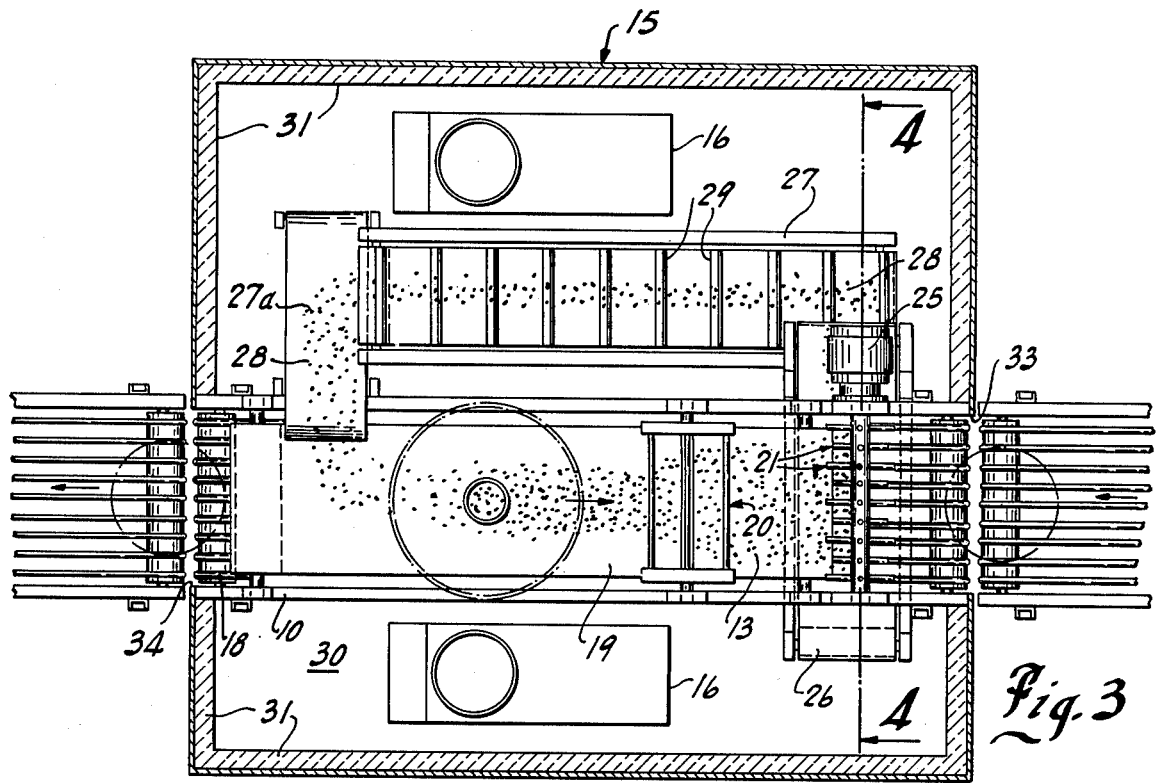
FIG. 3 is a top elevational view taken generally on line 3—3 of FIG. 2.

Referring particularly to FIGS. 2 and 3, the meat applicator 3 generally includes a supporting pizza shell conveyor 10 adapted to carry the sauce covered shells 1 through or beneath a shredded meat conveyor 11. A shredded meat supply hopper 12 is mounted above conveyor 11 and meat 13 is deposited onto the meat conveyor 11 in frozen, granulated or shredded form, transported on the conveyor 11 and drops from the discharge end as a free-falling column of meat 5 onto the sauce covered pizza shells as they move therebeneath. The meat supply 13 is supplied as frozen or essentially so granulated meat and the meat is positively maintained to prevent thawing during its transportation and freefall onto the shells.

In accordance with the illustrated embodiment of the invention, a special metering beater 14 is mounted at the discharge end of the meat conveyor 11 to accurately create free-falling meat column 5 for deposit of controlled weights of the shredded meat 5 onto the pizza shells 1.

In accordance with the illustrated embodiment of the present invention, the meat conveying apparatus 3 is mounted with an outer essentially complete enclosure 15 which is provided with an appropriate air cooling means 16 for maintaining of the temperature of the total apparatus within a controlled cooled environment. The cooling means 16 is shown including similar units to opposite sides of the transfer and meat applying units as hereinafter described. The units may be otherwise located within the enclosure or other cooling means provided within the present invention. The cooling units may, for example, be moved inwardly beneath the apparatus. Generally, each of the illustrated cooling means 16 establishes and maintains a continuous flow of cooling air 17 upwardly to the top of the enclosure and then downwardly over the meat, the conveying series and associated equipment. The temperature is preferably maintained below 20° F. and approximately in the range of 5° F. to 20° F. The shredded meat is applied in frozen form generally in a temperature of −10° F. to +10° F. The present inventor has found that this combination particularly provides a means of maintaining the shredded meat in appropriate state and condition for accurate metering and depositing on the pizza shells.

More particularly, conveyor 10 may be constructed with suitable laterally spaced individual belts 18 similar to that disclosed in the previous Kuhlman patents. The pizza shells 1 are supported thereon for movement through the assembly. The meat conveyor 11 may also be constructed as a flat stainless steel belt 19 adapted to support the shredded meat 13. A leveling unit 20 is provided to level and provide a relatively level layer of shredded meat 13 at the metering or discharge end of the conveyor 11.

Figure 4:
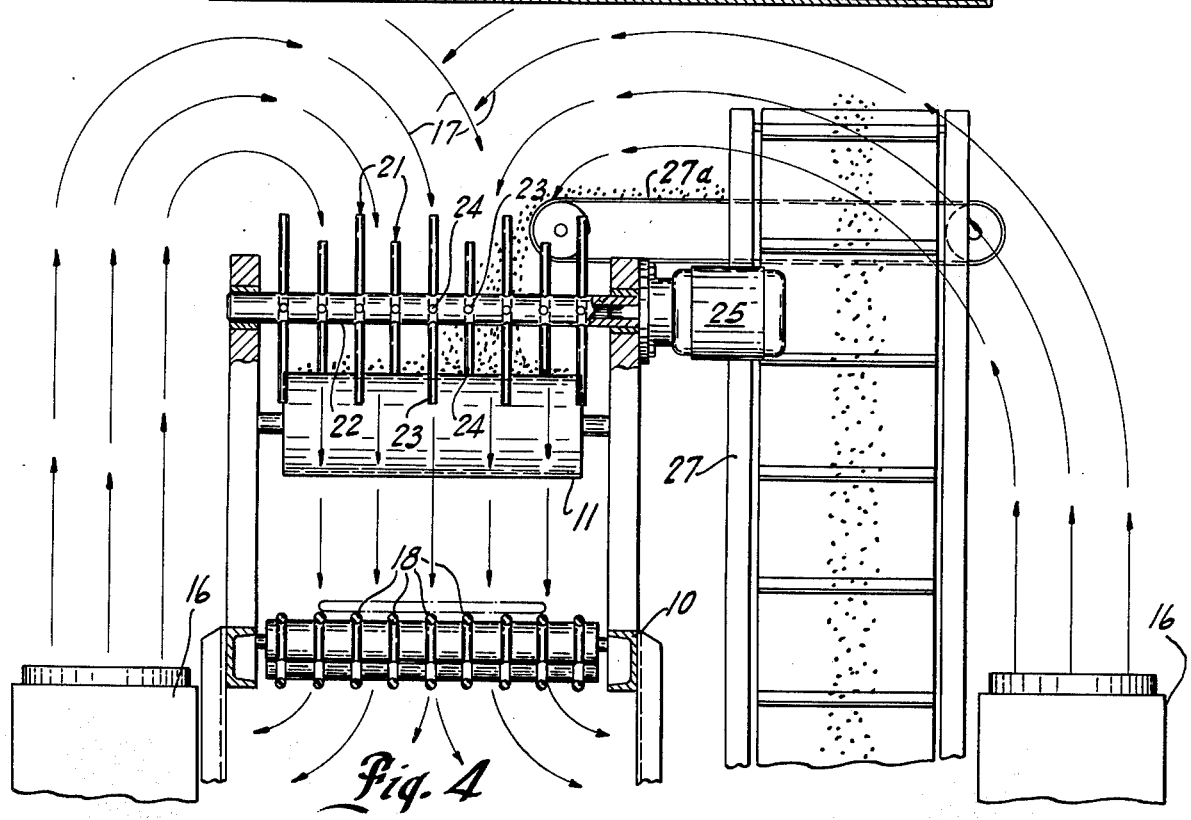
FIG. 4 is a view taken generally on the line 4—4 of FIG. 3.

The beater 14 is mounted adjacent the discharge end of the conveyor 11 and extends across the complete width of the belt structure. As more clearly shown in FIG. 4, the beater 14 is a multiple tined unit having a plurality of circumferentially distributed tined groups 21 secured to a rotating shaft 22 and axially spaced along the shaft for the length of the beater. The present inventor has found that the several tines of the beater unit 14 should not be formed of a single constant length but should be formed with varying lengths. In the illustrated embodiment of the invention, each tined group 21 is shown provided with different tine lengths, with alternate tines 23 and 24 of the different lengths. The shaft 22 is of course coupled to a motor means 25 such as a hydraulic motor. The different length tined beater has been found to properly distribute and regulate the amount of shredded meat allowed to drop as the continuous free-falling column 5 downwardly onto the pizza shells 1 for application of highly accurate amounts of volume and weight, of the shredded meat. For example, in a particularly practical construction, tines 1 ½ and 1 inches may be employed. The free-falling column 5 is a continuous curtain of meat which may extend laterally beyond the shells 1 and continues as the gap between shells 1 passes beneath the discharge end.

A shredded meat recovery system is provided including a laterally extended recovery belt 26 and a return conveyor 27. Belt 26 is mounted to extend from beneath the main conveyor 10 to transport excessive meat 28 to the lower end of the inclined return conveyor 27. The recovered shredded meat 28 is deposited on conveyor 27, as shown in FIG. 3. Conveyor 27 extends upwardly and laterally, as shown in FIGS. 2 and 3, with the upper end overlying a transfer conveyor 27a which extends laterally into overlying relationship to the input end of the meat conveyor 11. The conveyor 27 is provided with a plurality of spaced cleats 29 secured to a flat belt. The frozen recovered meat 28 is thus deposited onto the lower end, picked up by the cleats 29 and carried upwardly above the meat conveyor. As the cleats 29 rotate past the upper end, the shredded meat falls onto transfer conveyor 27a and then back onto the conveyor 11 for redistribution. The meat 28 is thereby carried upwardly into overlying relationship to the conveyor 11 and is deposited or dropped onto the meat conveyor 11.

In summary, shredded meat 13 is continuously supplied to the conveyor 11 from the hopper 12 and deposited therefrom downwardly onto the conveyor 11. As previously discussed, the granulated meat 13 is supplied to and maintained in the hopper in a frozen state, preferably at approximately −10° F. to +10° F. The meat 13 is dropped directly onto the conveyor belt 11 in such an essentially frozen form and moves through the applicator apparatus within enclosure 15 which is maintained at an appropriate temperature by cooling means 16 to prevent thawing thereof. This not only contributes to the ease of maintaining proper distribution on the conveyor and to the metering by the specially formed meter.

The enclosure 15 is shown as a special walled enclosure mounted on the floor 30 with four suitable sidewalls 31 and a top wall 32 for complete enclosure of the applicator 3. The opposite sidewalls 31 adjacent sauce applicator 2 and cheese applicator 6 have pass-through openings 33 and 34 for external removal of shells 1 through the cool controlled environment. The openings to the enclosure 15 may of course be provided with some separate sequence chambers to prevent loss of cooling through the opening.

The cooling units 16 are diagrammatically illustrated as a conventional well-known dual cooling coil assembly. The system is operated with only one of the two cooling units 16 operated at any given time and with the units operating alternately to insure the continual cooling of the environment and particularly the meat applicator 3. Thus, while one of the units 16 is defrosting, the other unit is employed to effect the cooling. A cooling plate or plates, not shown, may be provided immediately adjacent to the conveyor belt structure, either overlying the bed of meat or the like, to provide optimum characteristics of the shredded frozen meat during the transport and depositing.

Although the illustrated embodiment of the invention enclosure 15 is a separate housing, it may, of course, consist of a completely air conditioned room within which the meat applicator 3 as well as the other components of the total system are or are not located. These and other particular forms and structures will be readily provided by those skilled in the art and no further description thereof is given.

Various modes of carrying out the invention are contemplated as being within the scope of the following claims particularly pointing out and distinctly claiming the subject matter which is regarded as the invention.

I claim:

1. A food applicator apparatus for depositing of frozen shredded meat on a pizza crust, comprising a support means for said pizza crust, a horizontal conveying means located above the support means for transport of a layered mass of the frozen meat means for supplying frozen meat to said conveying means, a rotating beater unit having a plurality of circumferentially spaced and axially spaced metering blade elements, said beater unit being located adjacent the discharge end of the conveying means, said blade elements being of differing lengths, said beater unit rotating in the opposite direction from the movement of said conveying means for accurately metering of a freefalling column of shredded meat from said conveying means.

2. The apparatus of claim 1, including a cooling means having an outer enclosure, said support means and conveying means being located within the enclosure, and said cooling means including an air circulating means circulating air within the enclosure and over said conveying means and said support means.

3. The apparatus of claim 2, wherein said cooling means is constructed and operates to maintain the environment within said outer enclosure essentially in the range of 5° F. to 20° F.

4. Food application apparatus for applying frozen shredded meat to a pizza shell passing therethrough, comprising an apertured conveying means for carrying of the shells through the apparatus, a frozen shredded meat conveying means located above said apertured conveying means and carrying a layer of essentially frozen shredded meat to a discharge end portion, said meat being in particulate form and adapted to fall as individual meat particles, metering means mounted immediately adjacent to the discharge end of the meat conveying means and located in closely spaced relation thereto for continuous metering said frozen shredded meat into a free-fall column of meat particles from the discharge end portion of the meat conveying means, an enclosure means surrounding the meat conveying means and the apertured conveying means and the metering means and having openings aligned with the opposite ends of said apertured conveying means, and air cooling and circulating means associated with the enclosure for cooling the air and circulating the air in the enclosure to continuously maintain an environment within the enclosure below freezing temperature to hold said shredded meat as individual meat particles.

5. The apparatus of claim 4, wherein said metering means is a rotating beater member having a plurality of circumferentially and axially spaced metering blade elements, said blade elements being of differing lengths, said metering means rotating in the opposite direction from the movement of the conveyor means for accurately metering of the free-falling column of shredded meat.

6. The apparatus of claim 4, wherein said frozen shredded meat is at substantially −10 ° F. to +10° F., and said cooling and circulating means includes means for holding said environment essentially in a temperature range of from 5° F. to 20° F.

* * * * *